(12) United States Patent  
Hoelsaeter

(10) Patent No.: US 7,533,393 B2
(45) Date of Patent: May 12, 2009

(54) ROBOTICS FOR A DATA STORAGE SYSTEM

(75) Inventor: Håvard Hoelsaeter, Oslo (NO)

(73) Assignee: Tandberg Data ASA, Oslo (NO)

( * ) Notice: Subject to any disclaimer, the term of this patent is extended or adjusted under 35 U.S.C. 154(b) by 423 days.

(21) Appl. No.: 10/976,995

(22) Filed: Oct. 29, 2004

(65) Prior Publication Data

US 2005/0226704 A1  Oct. 13, 2005

Related U.S. Application Data

(60) Provisional application No. 60/515,738, filed on Oct. 30, 2003.

(51) Int. Cl.
*G11B 17/03* (2006.01)

(52) U.S. Cl. ..................... 720/630

(58) Field of Classification Search .......... 720/630, 720/245; 360/92; 369/30.3, 30.43
See application file for complete search history.

(56) References Cited

U.S. PATENT DOCUMENTS

| | | | |
|---|---|---|---|
| 4,802,035 A | | 1/1989 | Ohtsuka |
| 4,812,629 A | | 3/1989 | O'Neil et al. |
| 4,910,619 A | | 3/1990 | Suzuki et al. |
| 5,285,335 A | * | 2/1994 | Sato ............................ 360/92 |
| 5,303,214 A | * | 4/1994 | Kulakowski et al. ....... 369/30.3 |
| 5,508,859 A | | 4/1996 | Hu et al. |
| 5,781,368 A | | 7/1998 | Kotaki et al. |
| 6,041,026 A | * | 3/2000 | Hammar et al. .......... 369/30.43 |
| 6,134,212 A | | 10/2000 | Pines et al. |
| 6,271,982 B1 | | 8/2001 | Helmick |
| 6,327,113 B1 | * | 12/2001 | Mueller et al. ................ 360/92 |
| 6,570,734 B2 | * | 5/2003 | Ostwald et al. ............... 360/92 |
| 6,851,910 B2 | | 2/2005 | Luffel |
| 7,117,068 B2 | * | 10/2006 | Critchlow .................... 700/245 |
| 2003/0086202 A1 | | 5/2003 | Hoelsaeter |
| 2003/0123341 A1 | * | 7/2003 | Ostwald et al. .......... 369/30.43 |
| 2003/0183715 A1 | | 10/2003 | Hiraguchi |

FOREIGN PATENT DOCUMENTS

| | | |
|---|---|---|
| EP | 1 385 162 A1 | 1/2004 |
| GB | 2 381 935 A | 5/2003 |
| WO | WO 01/09888 A1 | 2/2001 |

* cited by examiner

*Primary Examiner*—Tianjie Chen
(74) *Attorney, Agent, or Firm*—Schiff Hardin LLP

(57) ABSTRACT

A data storage and retrieval device utilizes a data cartridge recording and playback apparatus and has storage magazines for holding a plurality of data cartridges for use by the recording and playback apparatus. A cartridge shuttle moves the data cartridges between the recording and playback apparatus and the storage magazines. The cartridge shuttle has a translation drive for moving the shuttle and the cartridges held therein along a translation space within the data storage and retrieval device. The shuttle also has an elevator for lifting and lowering the cartridges, a rotation apparatus to rotate the cartridges, and a cartridge gripper to move the cartridges into and out of the rotation apparatus.

21 Claims, 14 Drawing Sheets

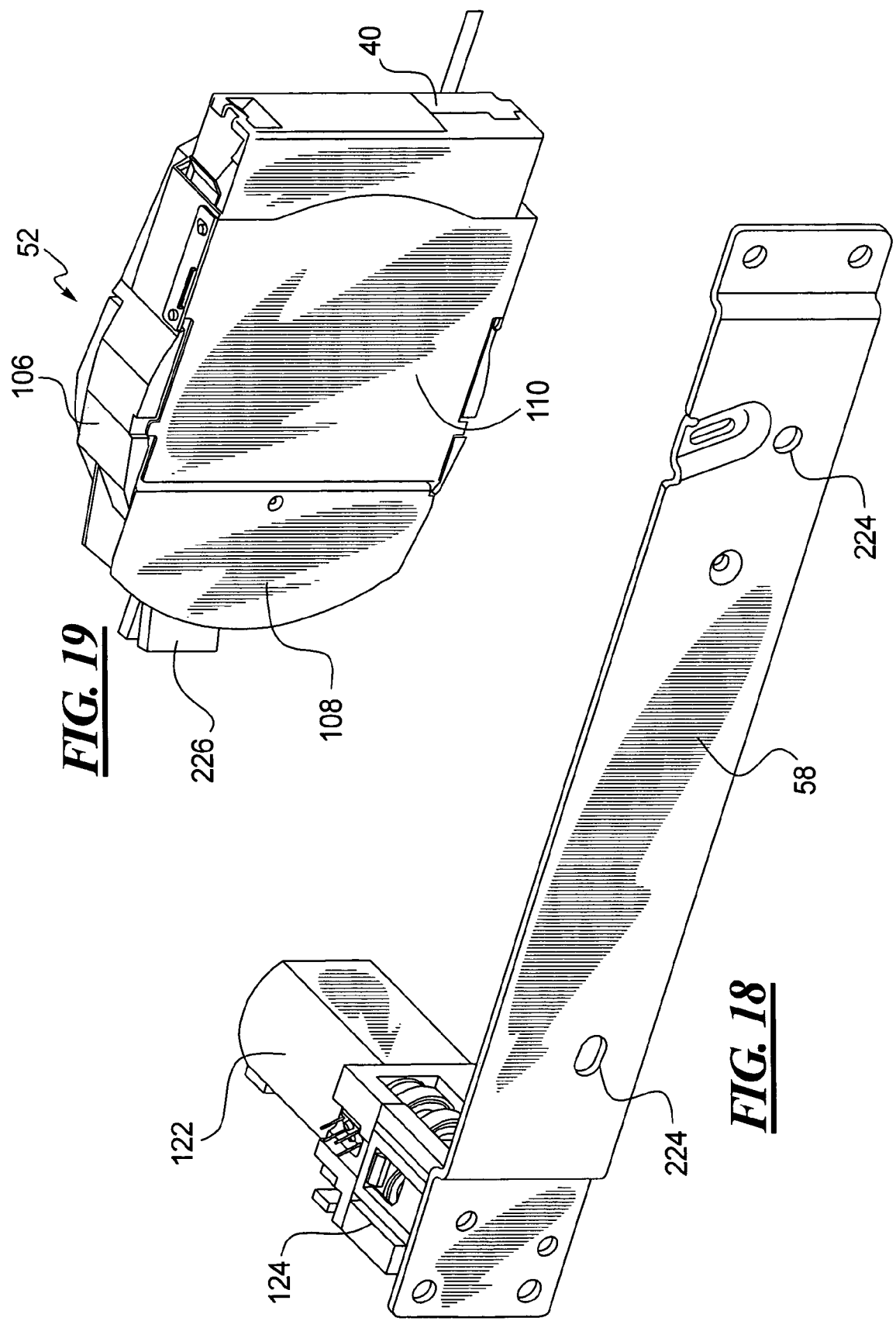

ROBOTICS FOR A DATA STORAGE SYSTEM

CROSS REFERENCE TO RELATED APPLICATION

This application claims the benefit of U.S. Provisional Patent Application, Ser. No. 60/515,738 filed Oct. 30, 2003, which is incorporated herein by reference.

BACKGROUND OF THE INVENTION

1. Field of the Invention

The present invention relates generally to a robotics apparatus for handling data cartridges in an automated data cartridge loader, and in particular, to a cartridge shuttle mechanism for transporting data cartridges between one or more tape drives and one or more cartridge storage magazines.

2. Description of the Related Art

Data storage and data backup on magnetic tape often requires the use of multiple tape cartridges. These multiple tape cartridges are selectively inserted into and removed from tape streaming devices, also referred to as tape recording and playback devices. Utilization of multiple tape cartridges is required for expanding data storage and/or storage of the data from different data backup events. For example, a data backup plan may provide for the use of a different tape for each day of the week.

Implementation of multiple tape cartridge storage has required a service technician to chance the cartridges from the tape streaming device, store the cartridges, and log the event to ensure that the proper cartridge is used at the proper time. Failure on the part of the service technician to change the cartridge at the right time or to use the correct cartridge can result in a failure of the data storage or backup plan.

The increase in data file size and the increased number of data files to be stored on a data storage system, along with the increased dependence on data in an electronic format has led to a greater need for reliable high capacity data storage and backup.

SUMMARY OF THE INVENTION

The present invention provides an automated data cartridge handling, recording and playback apparatus and method, including a cartridge shuttle operable to move a data cartridge horizontally, laterally, vertically, and rotationally. The cartridge shuttle moves the data cartridges from magazine slots to the recording and playback apparatus and moves the data cartridge from the recording and playback apparatus back to the storage slots in the storage magazine, moving the tape cartridges laterally, vertically, and rotationally in the process. The cartridge shuttle includes an apparatus for engaging the cartridge, referred to here as a cartridge picker which engages the cartridge during transport of the cartridge as well as during loading and unloading the cartridge in the cartridge storage magazines and in the recording and playback apparatus.

BRIEF DESCRIPTION OF THE DRAWINGS

The present invention will be described in further detail hereinafter by reference to the drawings which show a preferred embodiment of the invention.

FIG. 18 is a side perspective view of the traverse top plate assembly, including the elevator motor assembly and elevator tilt adjustment plate;

FIG. 19 is a top perspective view of the rotator assembly, including a rotator top cover and rotator cover plate and showing a data cartridge;

DETAILED DESCRIPTION OF THE PREFERRED EMBODIMENTS

Figure 1:
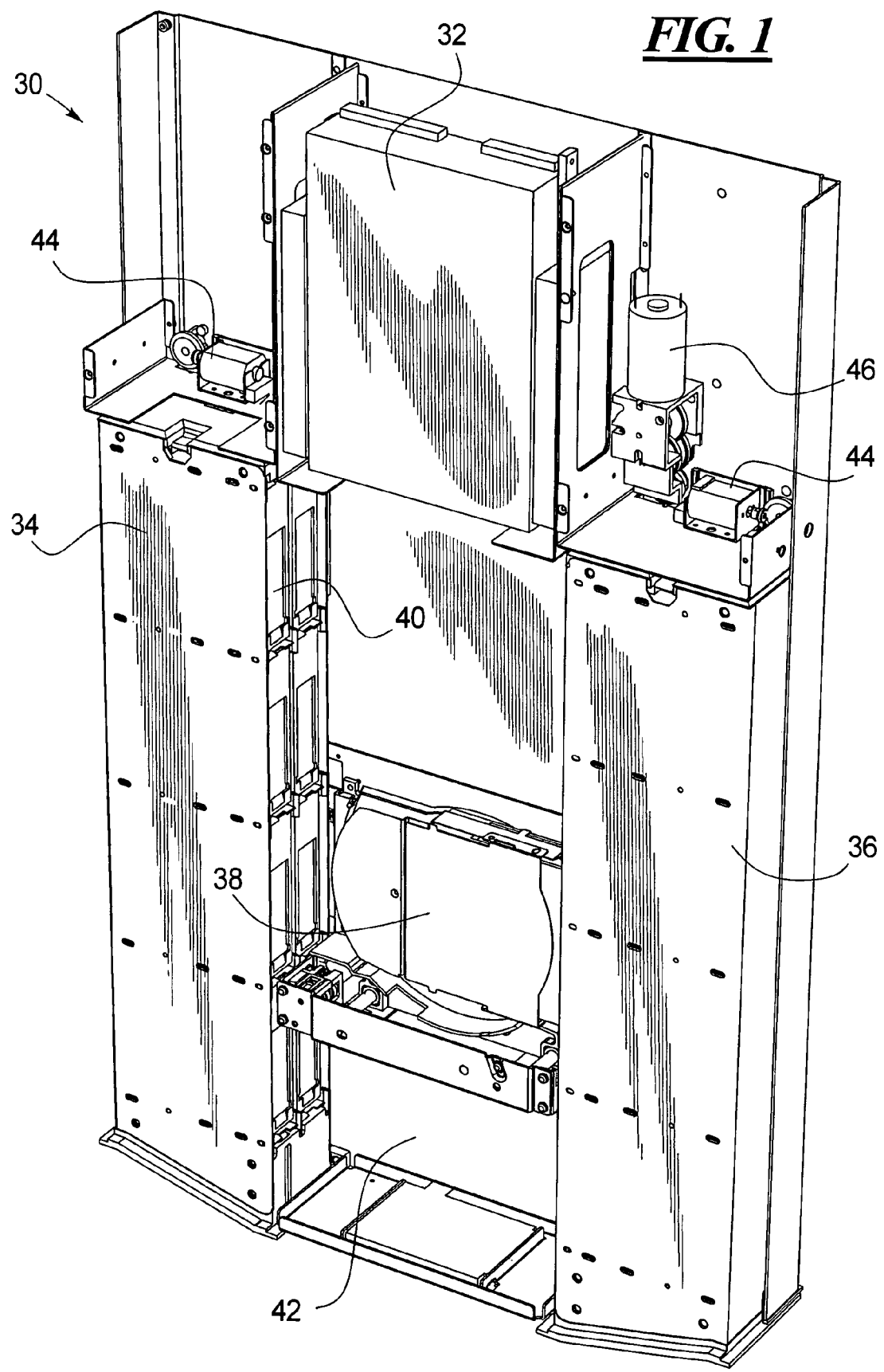
FIG. 1 is a top perspective view of an automated data cartridge handling recording and playback apparatus according the principles of the present invention, shown with the top and rear covers removed.

With reference to FIG. 1, an automated data cartridge handling, recording and playback device 30 is shown with a top cover and end cover removed. The data cartridge handling, recording and playback device is also referred to as a loader. The loader 30 is configured in a standard size and shape and in one embodiment conforms to the 2U standard size form factor for rake mounted electronic and computer components. The loader according to the present invention may be scaled to other sizes including conforming to the 1U form factor or to the 4U form factor. The loader 30 includes a tape recording and playback drive 32, two data cartridge storage magazines 34 and 36, and an automated data cartridge shuttle 38. Data cartridges 40 are shown in the storage magazine 34.

The data storage magazine 34 and 36 may be constructed according to co-pending U.S. Provisional Patent Application Ser. No. 60/516,542, filed Oct. 31, 2003, and to the non-provisional patent application filed claiming the benefit thereof, which is incorporated by reference herein.

The present device is scalable in accordance with the teachings of co-pending U.S. Provisional Patent Application Ser. No. 60/515,601, filed Oct. 30, 2003, and to the non-provisional patent application filed claiming the benefit thereof, which is incorporated by reference herein.

In general, the cartridge shuttle 38 moves within a central shuttle space 42 between the two storage magazines 34 and 36 and selectively accesses desired ones of the data cartridges 40. A selected data cartridges 40 is removed from a storage slot in the storage magazines 34 or 36 and carried by the cartridge shuttle 38 to the cartridge recording and playback device 32, which may also be termed a tape drive in some embodiments. Once in the recording and playback device 32, the tape cartridge 40 may be used for automated backup and/or restore functions for data on a computer system or computer network. Once the recording and playback device 32 has finished with the particular data cartridge 40, the cartridge shuttle 38 removes the data cartridge 40 from the recording and playback device 32 and returns the data cartridge 40 to a storage slot in the storage magazines 34 or 36. If needed, other data cartridges 40 may be removed from the storage magazines 34 and 36 by the cartridge shuttle 38 for use in the recording and playback device 32.

Also visible in the view of FIG. 1 is a magazine lock and release motor assembly 44 by which the storage magazines 34 and 36 may be secured into place inside the loader 30 or selectively removed therefrom. Each storage magazines 34 and 36 has a magazine lock and release motor 44. A traverse motor and gear assembly 46 is also seen in the image of FIG. 1.

Figure 2:
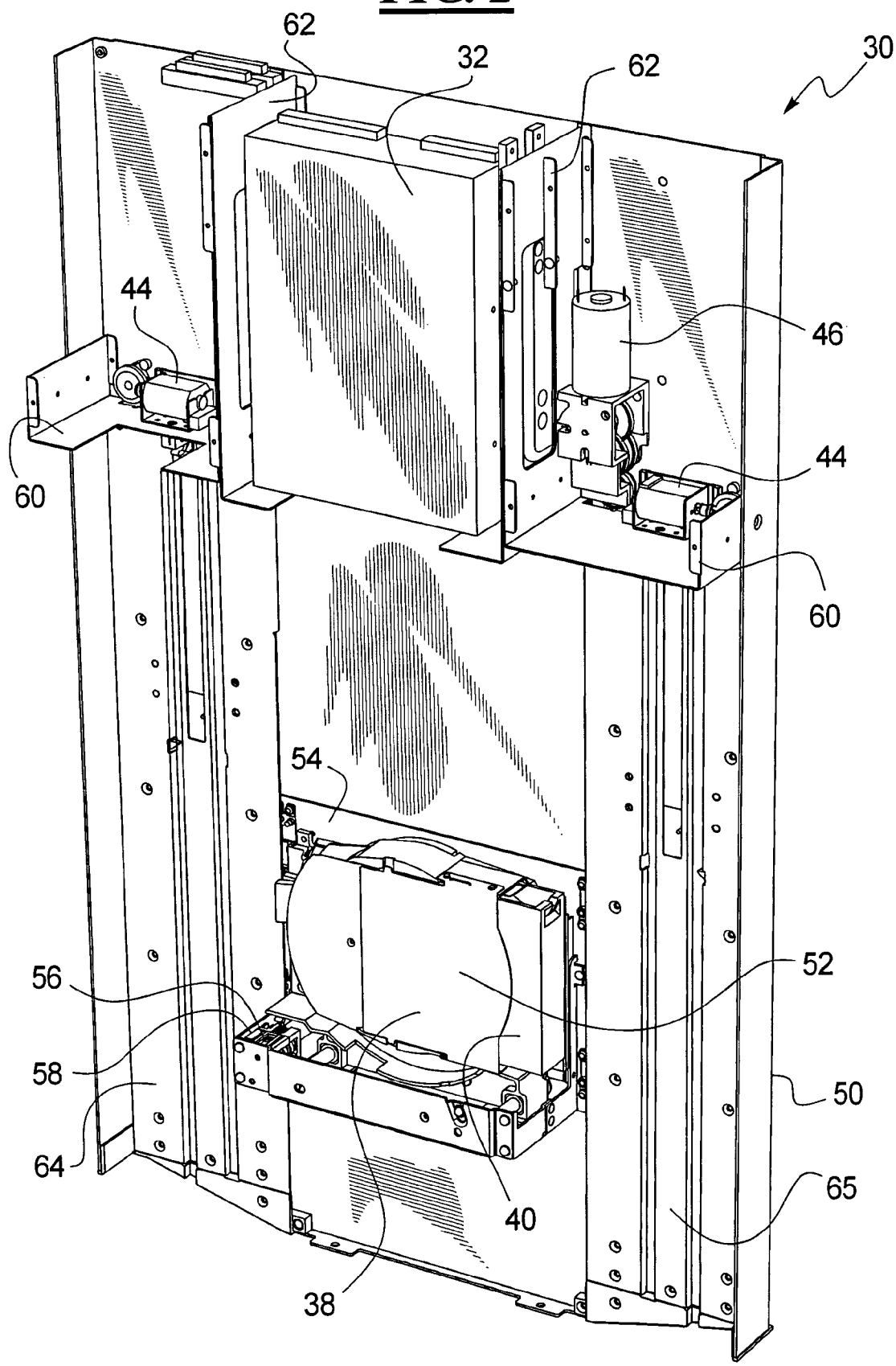
FIG. 2 is a top perspective view of a main chassis and robotics assembly of the cartridge handling, recording and playback apparatus of FIG. 1.

Turning now to FIG. 2, the loader 30 of FIG. 1 is shown without the storage magazines 34 and 36. The loader 30 includes a main chassis assembly 50 that supports the other components of the loader. The cartridge shuttle 38 of FIG. 2 is shown with a data cartridge 40 therein. The cartridge shuttle 38 includes a rotator assembly 52, a traverse assembly 54, an elevator assembly 56, and traverse top plate assembly 58.

In FIG. 2 the magazine lock and release motor assemblies 44 are shown mounted on magazine lock brackets 60, which connect to drive brackets 62 in which the data cartridge recording and playback apparatus 32 is mounted. The traverse gear assembly 46 is also shown.

On the main chassis assembly 50 is mounted a left traverse guide 64 and a right traverse guide 65 which directs the cartridge shuttle 38 in its traverse movement.

Figure 3:
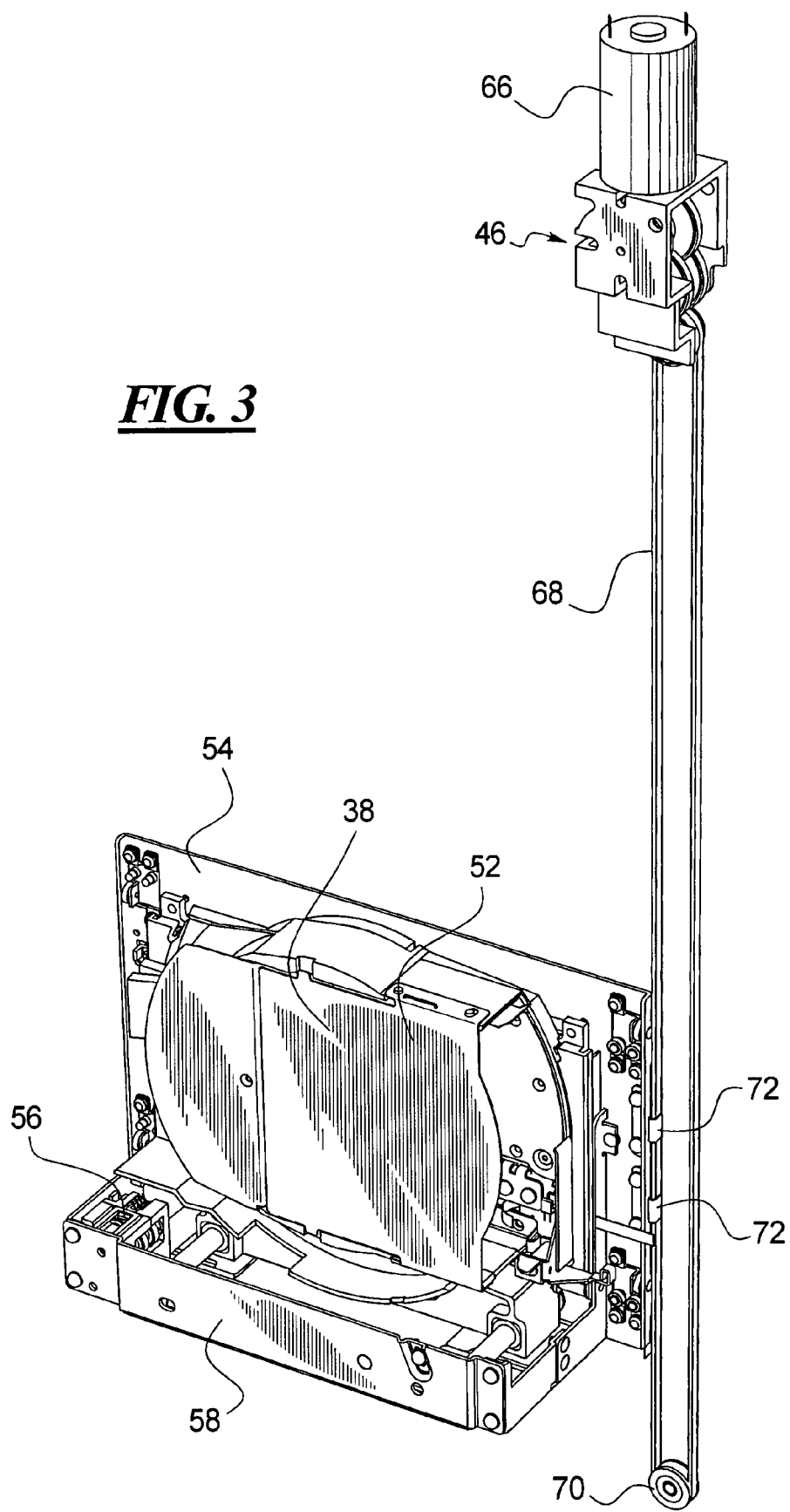
FIG. 3 is a top perspective view of a cartridge shuttle and traverse assembly of the apparatus shown in FIG. 1.

The traverse gear assembly is shown in isolation in FIG. 3. The traverse gear assembly 46 includes a traverse motor 66, the traverse gear assembly 46, and a traverse belt 68. The traverse belt 68 is connected at one end to the traverse gear assembly 46 and at an opposite end to a belt pulley 70. The belt pulley 70 is mounted on the main chassis 50 which is shown in FIG. 2. As may be understood by those of skill in the art, operation of the traverse motor 66 will cause the traverse belt 68 to move along its length direction, which here is denoted the Y axis. The traverse motor 66 is reversible so that it may move the traverse belt 68 in either direction. The cartridge shuttle 38 is clamped to the traverse belt 68 by traverse belt clamps 72. The shuttle 38 includes the traverse assembly 54, rotator assembly 52, elevator assembly 56, and traverse top plate assembly 58.

The movement of the cartridge shuttle 38 under the control of the traverse motor 66 and traverse belt 68 enable the cartridge shuttle 38 to be moved along the Y axis to determine which of the plurality of columns of data cartridges shall be accessed in the storage magazines. The traverse motor 66 and traverse belt 68 also act to move the data cartridges 40 toward and away from the recording and playback apparatus 32.

Figure 4:
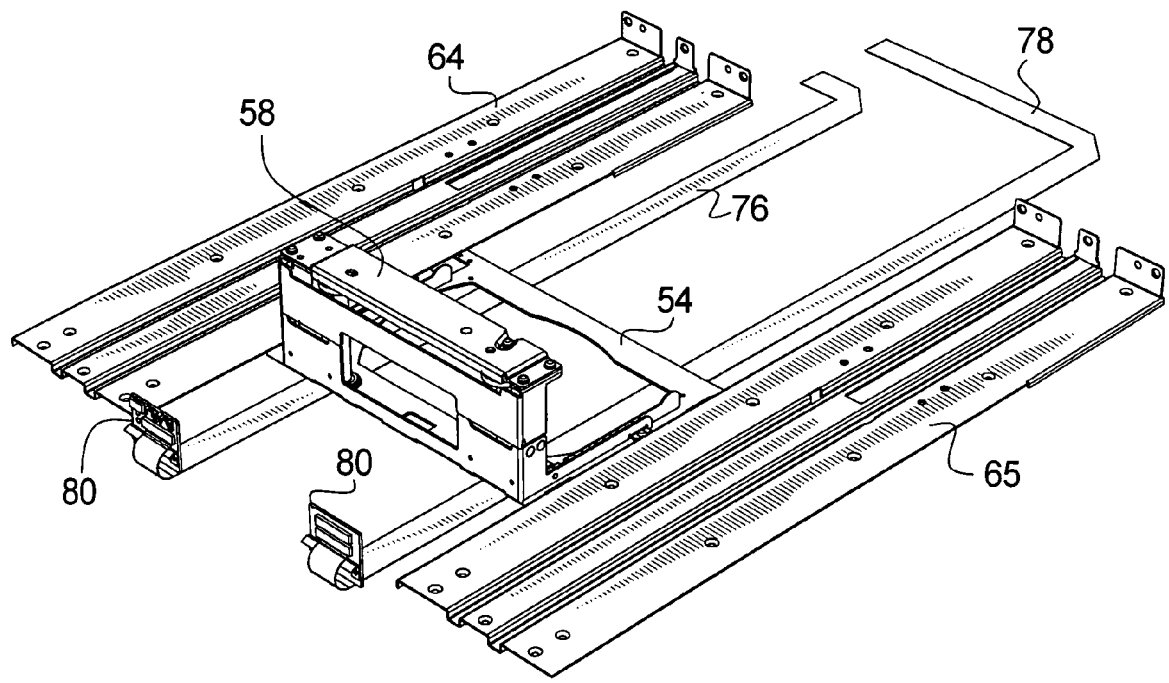
FIG. 4 is a top perspective view of a traverse guiding assembly, including flex cables of the device shown in FIG. 1.

FIG. 4 shows the left and right traverse guides 64 and 65. The traverse guides 64 and 65 guide the movement of the traverse assembly 54 and traverse top plate assembly 58 in the Y direction, which is along the long measurement of the traverse guides 64 and 65.

As may be seen, the traverse assembly 54 is an open frame in the illustrated embodiment.

Electrical power and control and feedback data is supplied to the cartridge shuttle 38 which includes the traverse frame 54 through left and right main robotic flex cables 76 and 78, respectively. The flex cables 76 and 78 lie along the main chassis 50 (as shown in FIG. 2) and included at one end thereof cable fasteners 80. The cable fasteners are shown in FIG. 4 separated from the traverse assembly 58 of the cartridge shuttle for the sake of clarity, but in operation would be connected to the cartridge shuttle to provide electrical and data communications between control electronics and the cartridge shuttle. At least a portion of the length of the flex cables 76 and 78 adjacent the cable connectors 80 is not connected to the main chassis 50 so that it permits the flat flex cables 76 and 78 to form a rolling loop during movement of the cartridge shuttle 58. The rolling loop of flex cable prevents excessive flexing and tension on the cable so that the cable remains in tact during repeated movements of the cartridge shuttle.

Figure 5A:
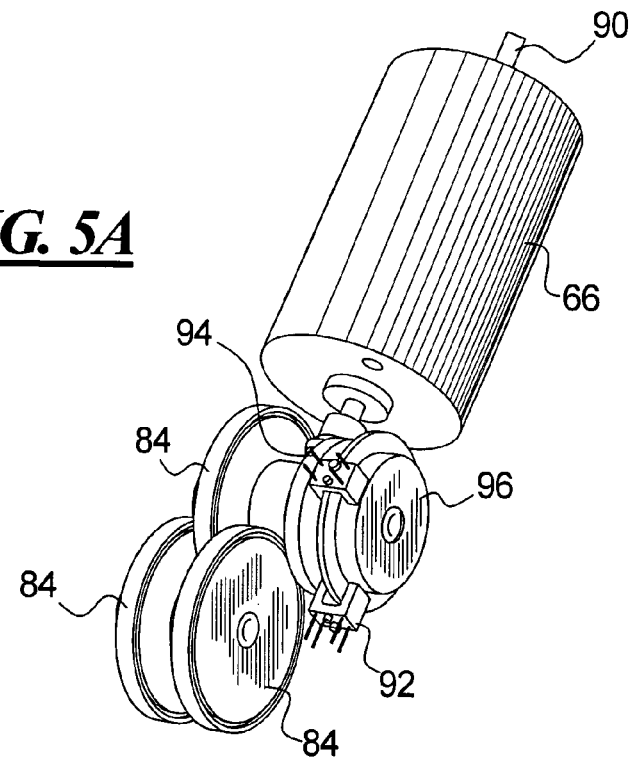
FIG. 5A is an enlarged detailed view in perspective of the motor, gears and tachometer of the traverse gear assembly if FIG. 5.
Figure 5:
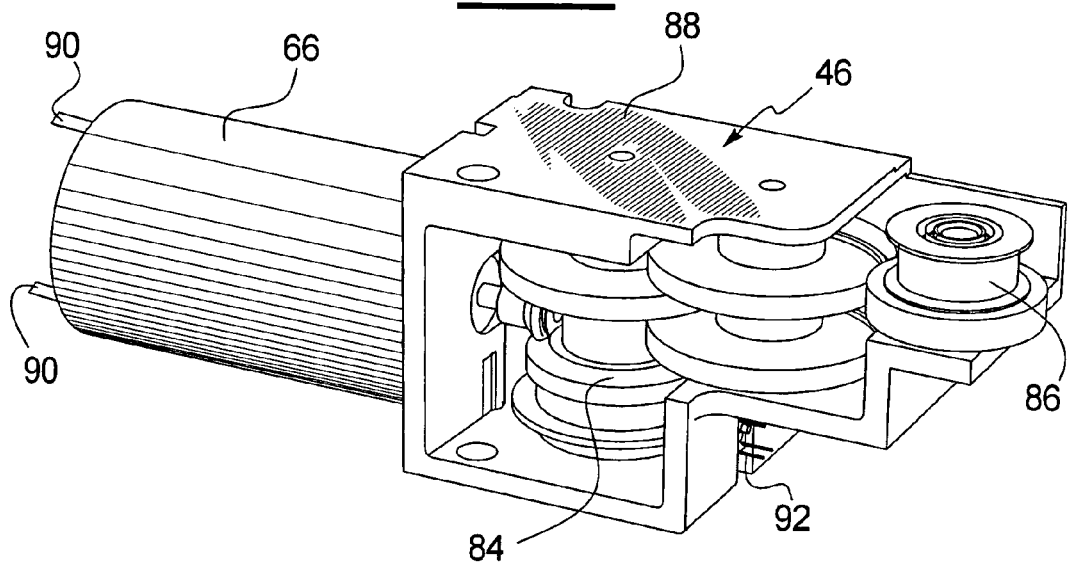
FIG. 5 is an enlarged perspective view of a traverse gear assembly of the device as shown in FIG. 1.

Turning to FIG. 5, the traverse gear assembly 46 with the traverse motor is shown. The traverse motor 66 drives traverse gear wheels 84 which reduce the rotational speed from the motor 66 to a traverse belt pulley 86 around which the traverse belt 68 is mounted, as shown in FIG. 3. The gear wheels 84 are mounted in a gear frame 88. Power is provided to the traverse motor 66 through leads 90. A sensor, such as an optical sensor, 92, is provided for sensing rotational speed of the gears 84 for feedback purposes. A plurality of the gears 84 is preferably provided, although various alternative speed reducing means may be provided instead.

The traverse motor 66 and speed reduction gears 84 are shown in further detail in FIG. 5A. The optical sensor 92 is a photo interrupter in the preferred embodiment, and a second photo interrupter 94 is also provided. The photo interrupters 92 and 94 are mounted adjacent a tachometer disk 96 that rotates with the reducer gears 84 and includes openings which move into and out of the beam of the photo interrupters 92 and 94 to provide operational feedback relating to the operation of the traverse motor 66. The position, speed and movement direction of the cartridge shuttle along the traverse direction, along the Y axis, is controlled using the tachometer disk 96 and photo interrupters 94 and 92. As will be understood by those of skill in this art, the photo interrupters 92 and 94 are offset relative to the positions of the openings in the tachometer disk 96 to provide sensitivity greater that the spacing of the openings.

In addition to the feedback provided by the tachometer disk 96 of FIG. 5A, a preferred embodiment of the present apparatus includes a further photo interrupter mounted to the traverse base of the cartridge shuttle, which photo interrupter is adjacent a tachometer stripe mounted along the left traverse guide. The motion of the cartridges shuttle may thereby be directly measured by the photo interrupter, tachometer stripe combination as well understood by those of skill in this art.

Figure 6:
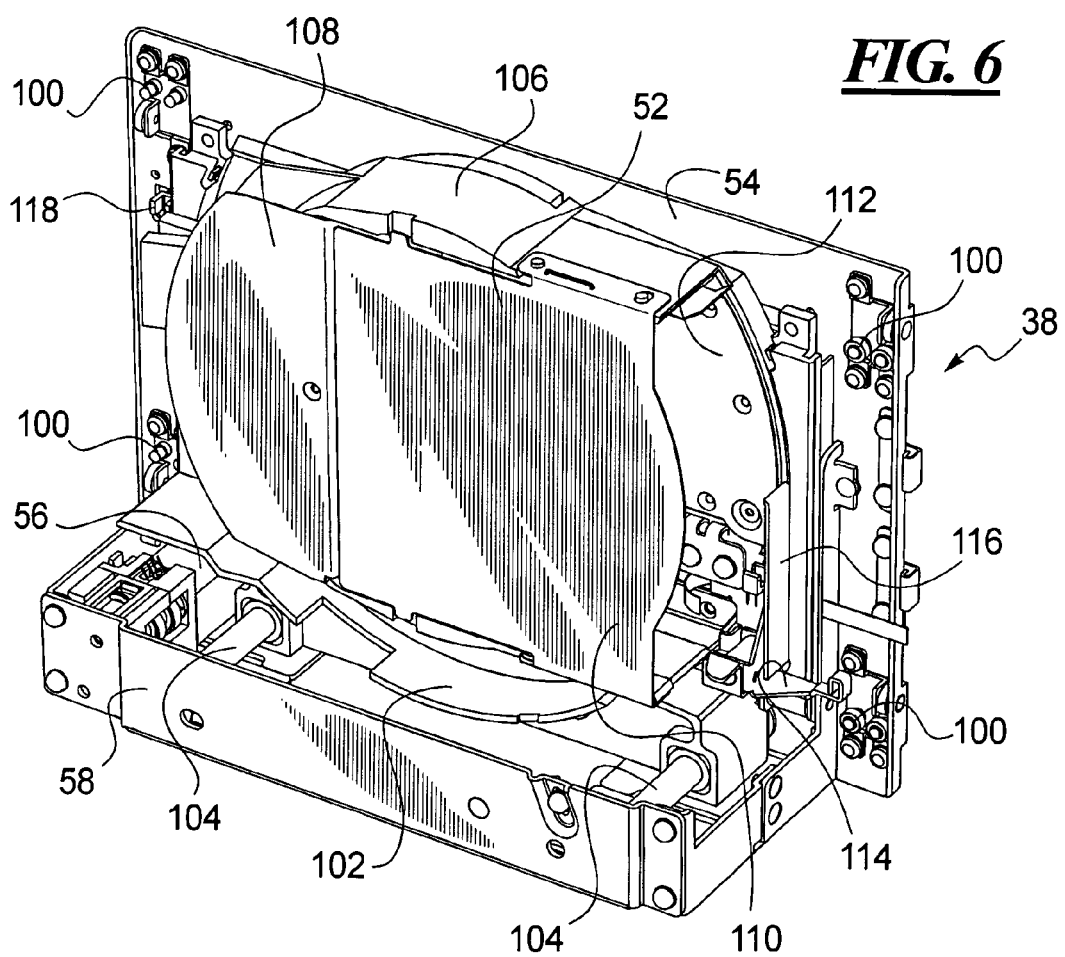
FIG. 6 is a top perspective view of the data cartridges shuttle of the device of FIG. 1, including a rotator base, traverse base and elevator base.

With reference to FIG. 6, the cartridge shuttle 38 is shown with the traverse base 54, elevator assembly 56, traverse top plate assembly 58 and rotator assembly 52. In particular, the traverse base 54 includes traverse roller assemblies 100 mounted on the left and right edges thereof, relative to the left and right traverse guides 64 and 65. On the traverse base 54 is mounted the traverse top plate assembly 58 which houses the elevator assembly 56. The elevator assembly 56 includes an elevator base 102 that is supported on elevator shafts 104. On the elevator base 102 is provided the rotator assembly 52, which includes a rotator base 106, rotator cover place 108 and rotator top guide plate 110. The rotator cover plate 108 extends beneath the rotator top guide plate at a portion 112. A cavity or space is formed between the rotator top guide plate and the portion 112 for accepting a data cartridge 40. Extending from the cavity in the illustration of FIG. 6 is a cartridge gripper 114 and cartridge stop plate 116.

Also shown on the traverse base 54 is a photo interrupter 118 for sensing movement along the Y axis using a tachometer stripe on the left traverse guide 64, as discussed above. The photo interrupter 118, as well as the other sensors, motors, solenoids and electrical components are connected electrically to one or more controls for effecting and coordinating the operation thereof.

Figure 7:
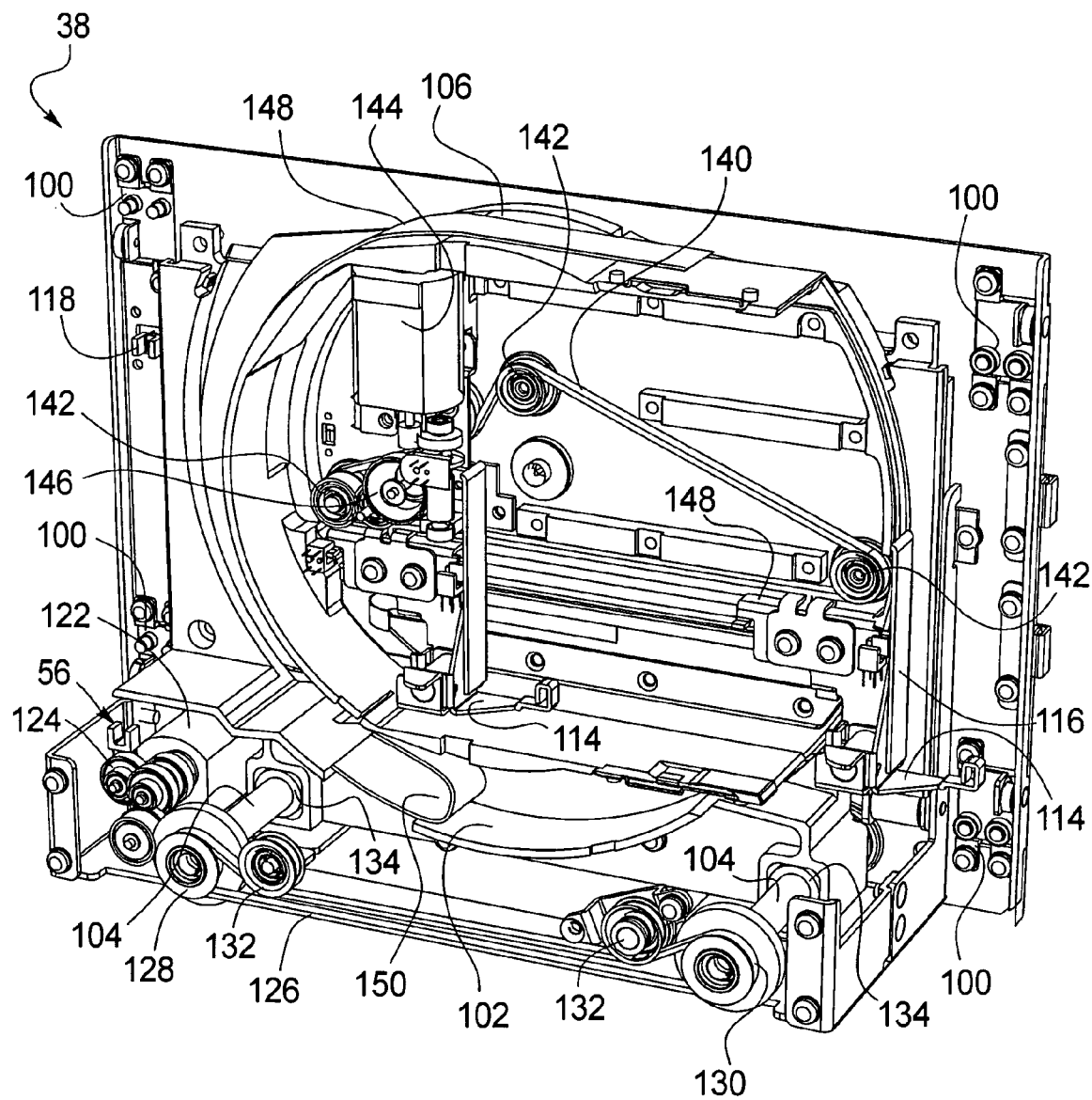
FIG. 7 is a perspective view similar to FIG. 6 showing the shuttle cartridge with the rotator top guide plate and rotator cover plate removed to review the gripper assembly and elevator gear assembly.

The shuttle cartridge 38 is shown in FIG. 7 with the rotator top guide plate 110 and rotator cover place 108 removed. The traverse top plate assembly 58 is also removed. The elevator assembly 56 includes an elevator motor 122 connected through an elevator gear assembly 124 for speed reduction, that in turn is connected to the elevator shaft 104. An elevator belt 126 extends between a pulley 128 on the first elevator shaft 104 to a pulley 130 on the second elevator shaft 104. Idler pulleys 132 bear against the elevator belt 126 to provide the proper tension on the belt.

The elevator shafts 104 extend through elevator nuts 134 in the elevator base 102 so that the rotation of the elevator shafts 104 results in movement of the elevator base along the length of the elevator shafts 104. At least one, and preferably two, of the elevator nuts 134 is mounted in a floating mounting to prevent binding of the elevator base 102 as it moves.

The gripper assembly 114 is shown, for the sake of illustration, in two different positions at the extremes of its travel. In practice, the device has a single gripper assembly 114 that is moved between the illustrated positions. In the outer position, to the right in FIG. 7, the gripper assembly is in the position at which a cartridge is engaged, and at the left position in FIG. 7 is at the inner position at which the cartridge is in a transport position. The gripper assembly is moved by a gripper belt 140 that runs over pulleys 142. The gripper belt 140 is driven by a gripper motor 144 through a gripper gear assembly 146 that drives one of the pulleys 142. The gripper assembly 114 includes a belt clamp 148 that fastens to the gripper belt 140 to permit the gripper assembly 114 to move back and forth between the cartridge engaging position and the cartridge transport position.

Electrical power and control data is provided to the reversible gripper motor 144 through a rotator flex cable 148. The rotator flex cable 148 is curved into a rolling loop at 150 to accommodate rotational movement of the rotator base 106. The gripper gear assembly 146 includes optical sensors, such as photo interrupters, and a tachometer disk similar to that described above with respect to the traverse assembly for positional and motion feedback to a master control.

Figure 8:
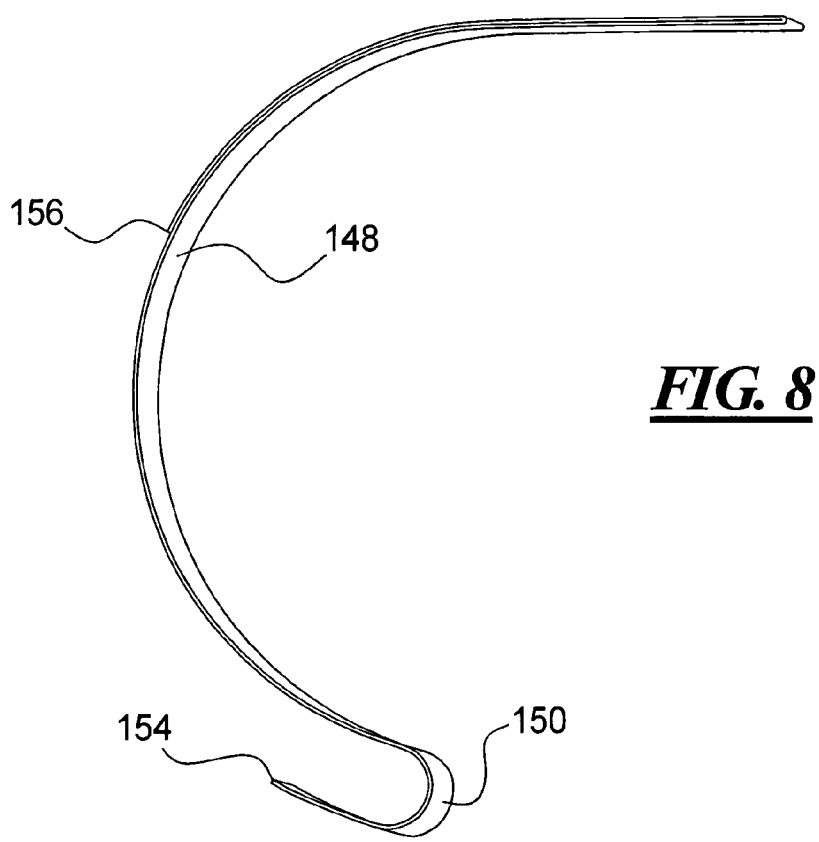
FIG. 8 is a perspective view of a flex cable as used in the cartridge shuttle of FIG. 6.

FIG. 8 shows the rotator flex cable 148 removed from the cartridge shuttle 38. The flex cable rolling loop 150 may be more clearly seen. The flex cable 148 includes a connector end 154 and a connector end 156. The connector end 156 is attached to the rotator assembly while the connector end 154 is connected to the elevator base 102. During rotation of the rotator assembly, the flex cable rolling loop 150 will roll back and forth between the rotator base wall and the elevator base wall 102. This rolling movement will create minimum stress on the cable so that the cable can withstand a sufficient number of rotation cycles during the service lifetime of the apparatus.

Figure 9:
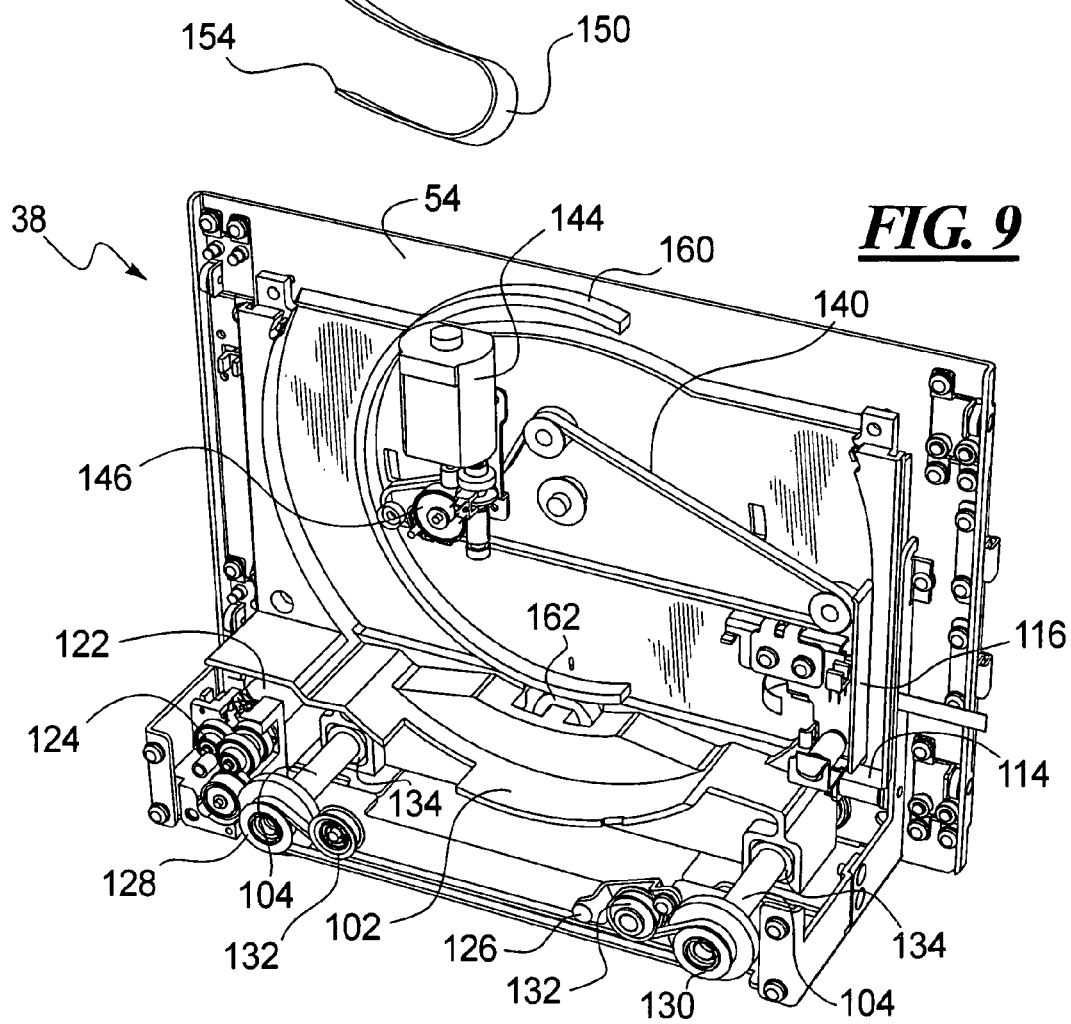
FIG. 9 is a perspective view similar to that of FIG. 6 showing the elevator mechanism of the cartridges shuttle.

FIG. 9 shows the cartridge shuttle 38 with the rotator base 106 removed. The elevator shafts 104, which are threaded and on which are provided the elevator nuts 134 that are mounted in the elevator base 102 enabling data cartridges 40 to be lifted vertically away from the traverse base 54. The elevator gear assembly 124 driven by the elevator motor 122 which rotates the elevator shafts 104 through the elevator belt 126 are visible. The rotation of the elevator shafts 104 moves the elevator nuts 134 and the elevator base 102 along the length of the elevator shafts 104. In particular, rotation of the elevator motor 122 causes rotation of the elevator belt pulleys 128 and 130. The rotational motion between the elevator belt pulleys 128 and 130 being transmitted by the elevator belt 126 which is kept under tension by the idler pulleys or belt tension pulleys 132. The elevator motion is referred to here as motion along the Z axis.

The gripper motor 144 and gripper gear assembly 146 and gripper belt 140 may also be seen in FIG. 9. The gripper assembly 114 and cartridge stop plate 116 are shown in the outer position in FIG. 9.

Also visible in FIG. 9 is a spur gear ring 160 that extends over a portion of a circle and which is engaged by a spur gear 162. Rotational motion of the cartridge is achieved by the interaction between the spur gear and spur gear ring 160. The rotator base 106 (which is not shown in FIG. 9) is mounted to the spur gear ring 160 so that rotation of the spur gear 162 rotates the rotator base.

Figure 10:
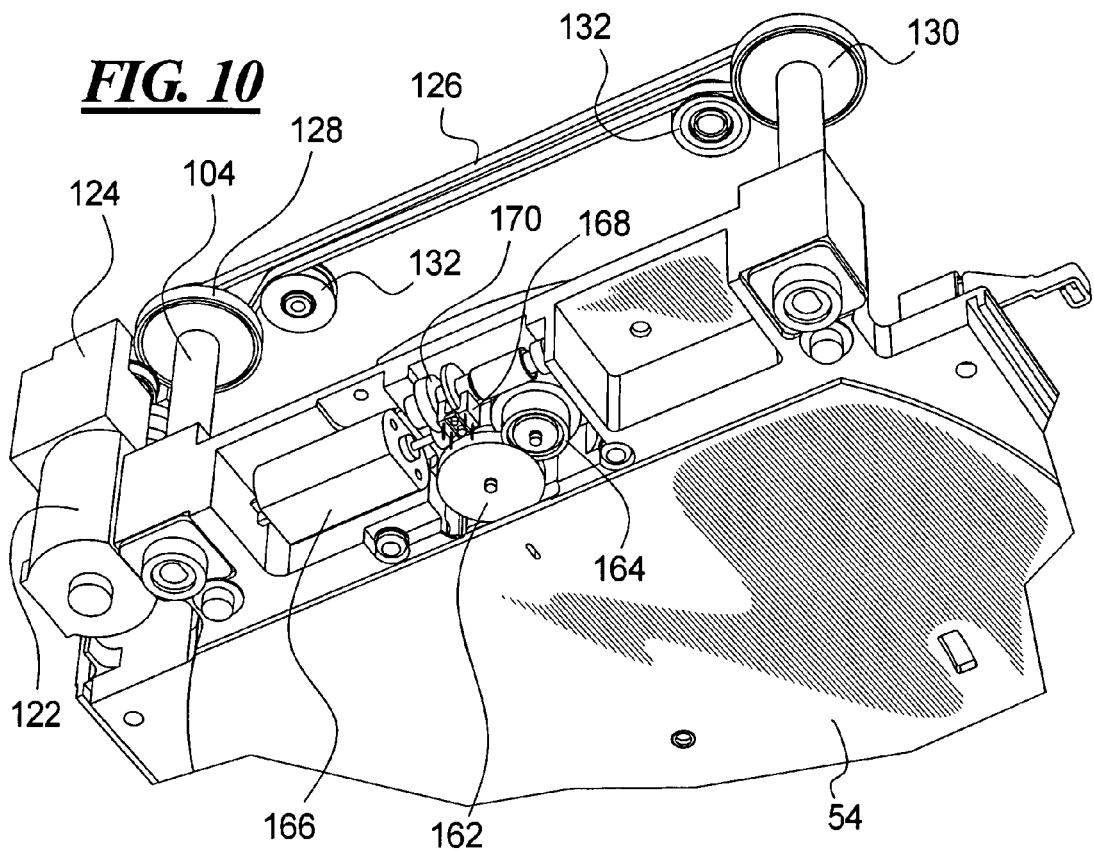
FIG. 10 is an enlarged bottom perspective view of a portion of the cartridge shuttle showing the rotator motor and gear assembly.

With reference to FIG. 10, the Spur gear 162 is visible from beneath the traverse assembly 54. The spur gear 162 is driven through a spur gear assembly 164 to reduce the speed of a spur gear motor 166. An optical sensor 168 is provided in the spur gear assembly 164 for monitoring the rotation of the spur gear assembly 164 and thereby determining the positioning of the rotator. Also provided in the spur gear assembly 164 is a thumb wheel 170 which is manually operable to move the rotator around in position during servicing, for example. The manual thumb wheel 170 can also be used for initial setup to ensure proper alignment of the rotator assembly.

Also seen in image 10 is the elevator motor 122 and elevator gear assembly 124 for driving the elevator belt 126.

Figure 11:
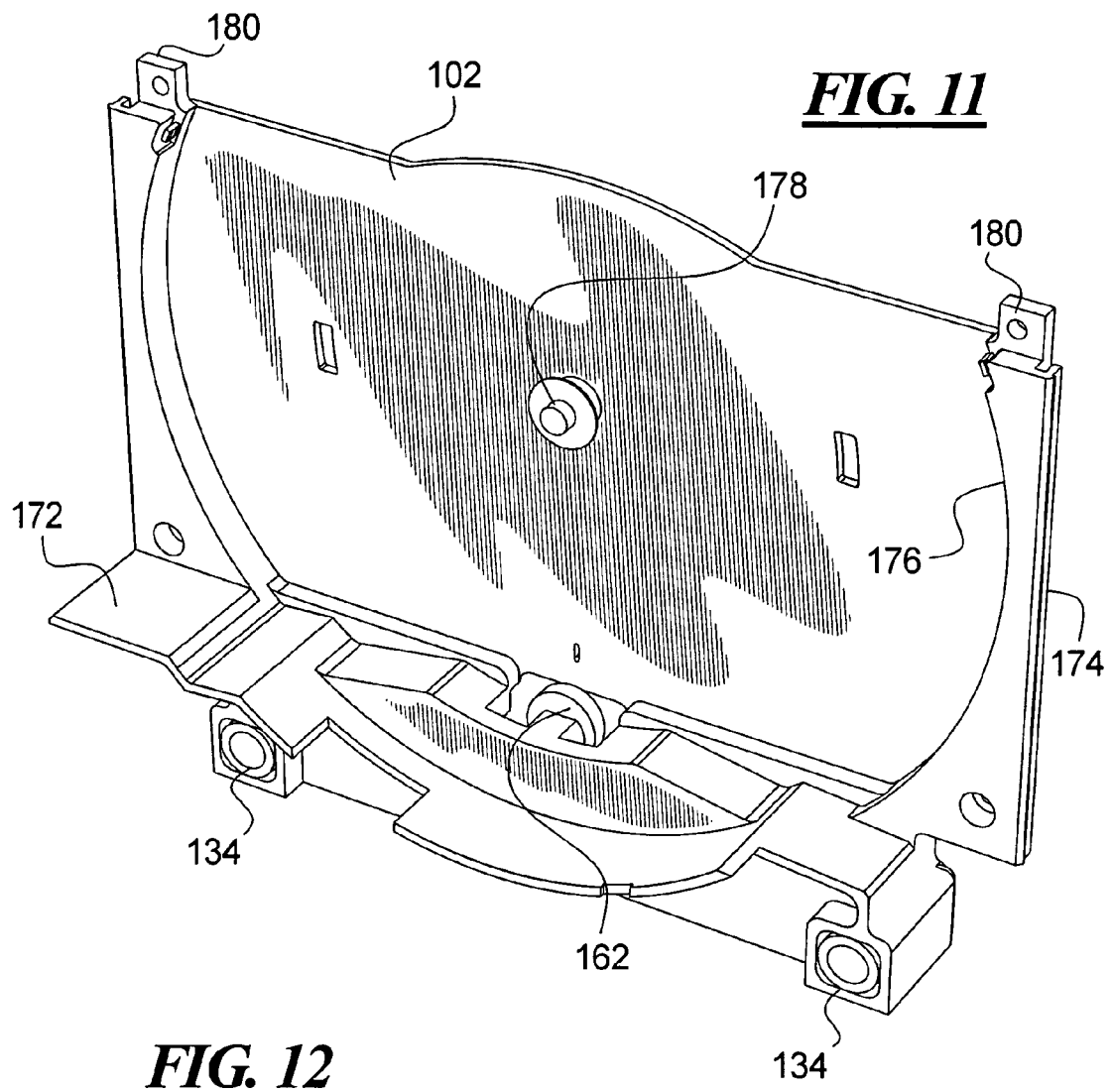
FIG. 11 is a top perspective view of the base of the elevator assembly and showing elements of the rotator assembly.

In FIG. 11, the rotator and elevator base assembly 102 is shown with the spur gear 162 mounted to that it will engage the spur gear ring when the apparatus is assembled. The spur gear 162 is mounted in a housing portion 172 that includes the elevator nuts 134. A planner horizontal portion 174 extends from the housing 172 and includes a semi-circular recess 176 in which the rotator assembly rotates. The rotator assembly rotates on a rotation bearing 178 at the center of the semi-circular recess 176. A pair of sensors 180 are provided at the ends of the semi-circular recess 176 to sense the rotation of the rotator assembly.

Figure 12:
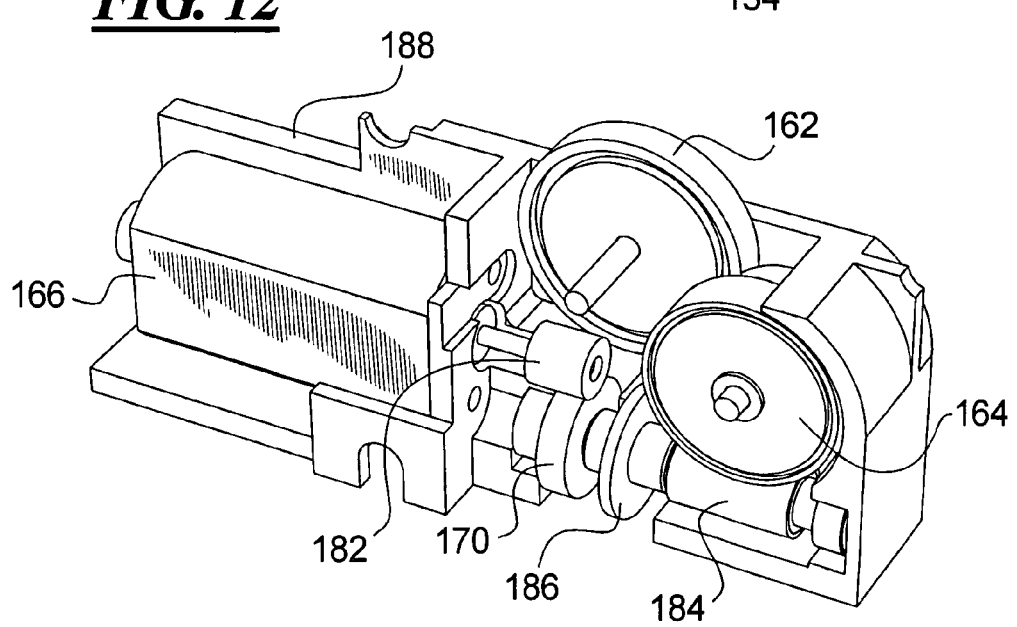
FIG. 12 is an enlarged perspective view of the rotator gear assembly.

FIG. 12 shows the rotator motor at 166 and rotator gear assembly 164 from the top view, as opposed to the bottom view of FIG. 10. The motor 166 is connected through a series of gears in the gear assembly 164, including radial gears 182 and a worm gear 184 to transmit the power from the motor 166 to the spur gear 162. The optical sensor 168 has been removed to reveal the photo interrupter tachometer disk 186 in the gear assembly 164. A rotator motor and gear assembly cover 188 supports the motor 166 and gear assembly 164 and covers the opening shown in 188 supports the motor 166 and gear assembly 164 and covers the opening shown in FIG. 10, so that the rotator motor 166 and rotator gear assembly 164 are covered when the present apparatus is fully assembled.

Figure 13:
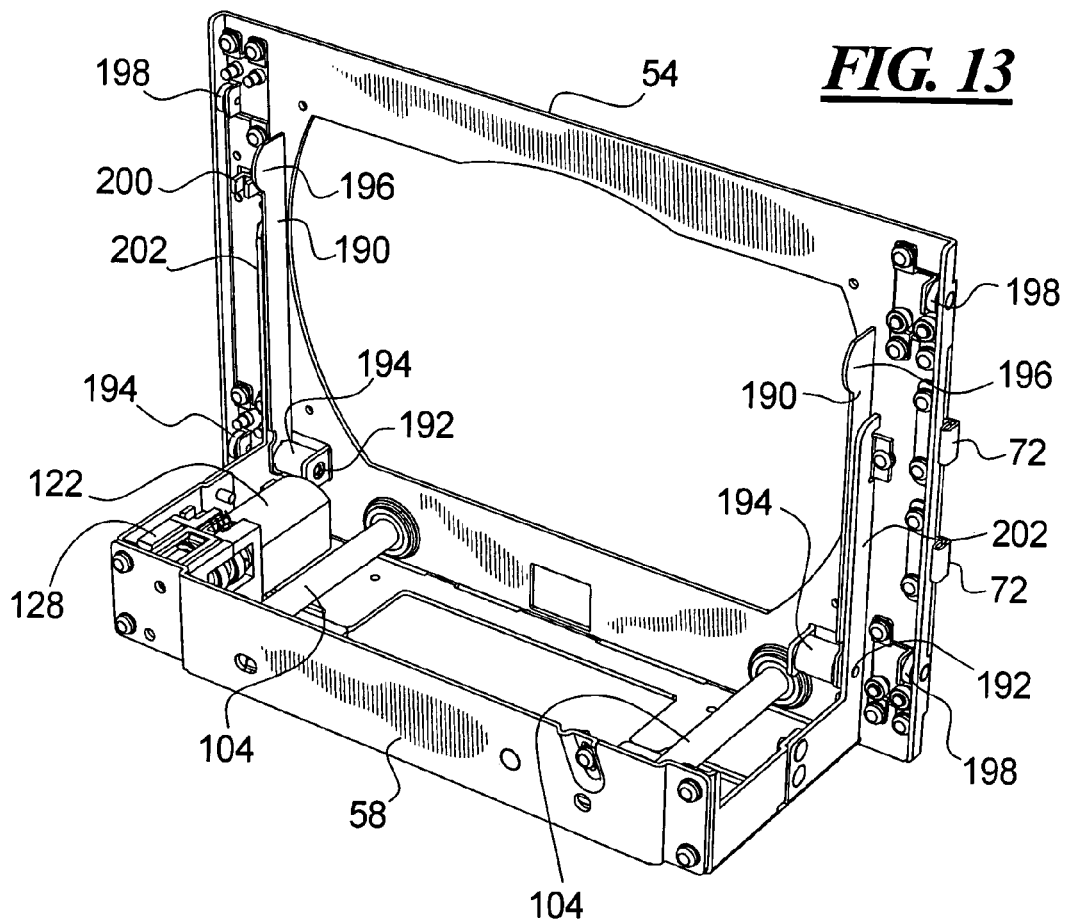
FIG. 13 is a top perspective view of the traverse assembly, including the elevator assembly and lifter arms.

In FIG. 13, the traverse base 54 on which the rotator/elevator base assembly 102 of FIG. 11 is mounted includes lift arms 190 at each side thereof which are pivoted at pivot mounts 192 that are provided by lifter springs 194 and that have distal lifting ends 196 to bear upwardly on the outer ends of the elevator base 102. As the elevator base is moved vertically by the elevator screw shafts 104 that are mounted at one side of the elevator base, the lifter arms 190 press upwardly on the opposite side of the elevator base 102 to support the weight of the machinery and the tape cartridge and thereby prevent binding of the elevator base during vertical movement.

The traverse base 54 has the traverse top plate assembly 58 spaced therefrom to support the elevator screw shafts 104 and the elevator motor assembly 122 and elevator gear assembly 124. The traverse top plate assembly 58 covers the elevator belt to shield the belt from contact.

The traverse base 54 has traverse rollers 198 adjacent the four corners of the traverse base 54. The rollers 198 permit the traverse base and the auto loader mechanism mounted thereon to move within the traverse space in the auto loader. A pair of clamps 72 are provided along one side of the traverse base 54 to hold the traverse base to the traverse belt. An optical sensor 200 is provided on the traverse base to sense movement along the traverse guides 64 and 65.

To prevent deforming of the traverse assembly 54, and in particular to prevent tipping of the traverse top plate assembly 58 relative to the traverse base, extended support arms 202 extend from the traverse top plate assembly 58 along the planner surface of the traverse base 54 adjacent to and parallel to the lifter arms 190.

Figure 15:
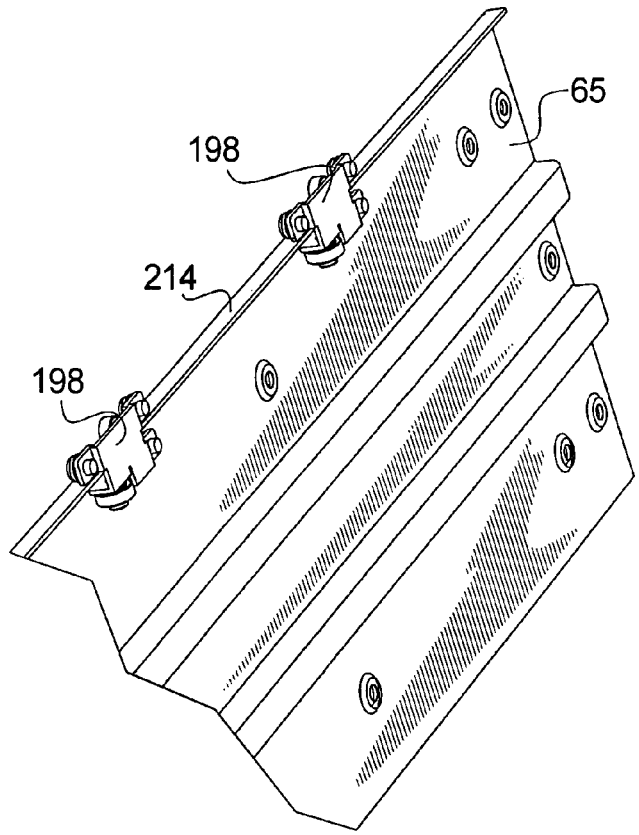
FIG. 15 is a perspective view of traverse roller assemblies as shown in FIG. 14 on a traverse guide rail.
Figure 14:
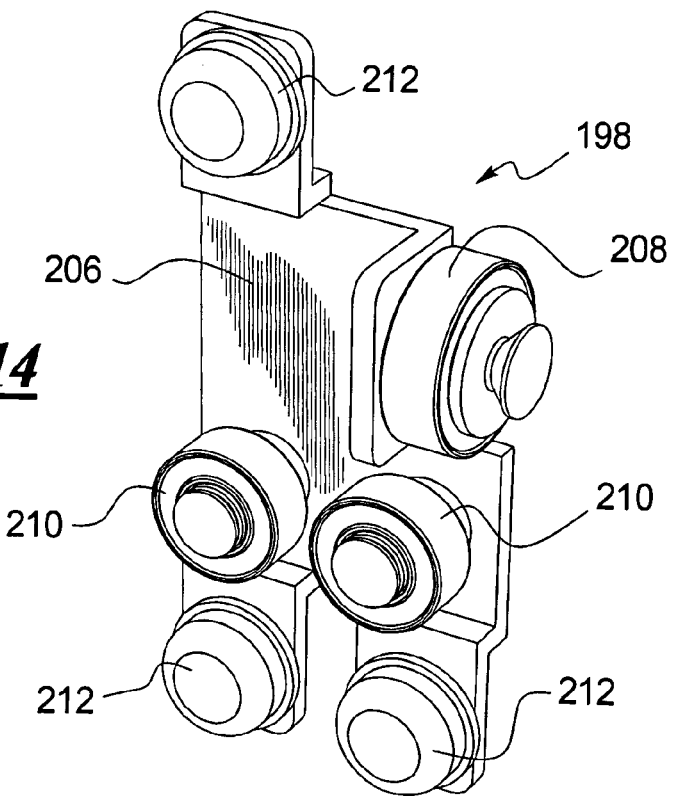
FIG. 14 is an enlarged perspective view of the traverse roller assembly, ride side for the cartridge shuttle.

The rollers 198 mounted on the traverse base 154 are shown in further detail in FIG. 14. The traverse roller assembly 198 includes a roller bracket 206 on which is mounted a Z-axis roller 208 and a pair of Y-axis rollers 210. The bracket includes rivets or bolts 212 for mounting the bracket 206 to the traverse base 54. FIG. 15 illustrates the movement of the traverse roller assemblies 198 on the right traverse guide 65. In particular, the traverse guide 65 has an upturned edge rail 214 on which the traverse roller assemblies 198 roll.

Figure 16:
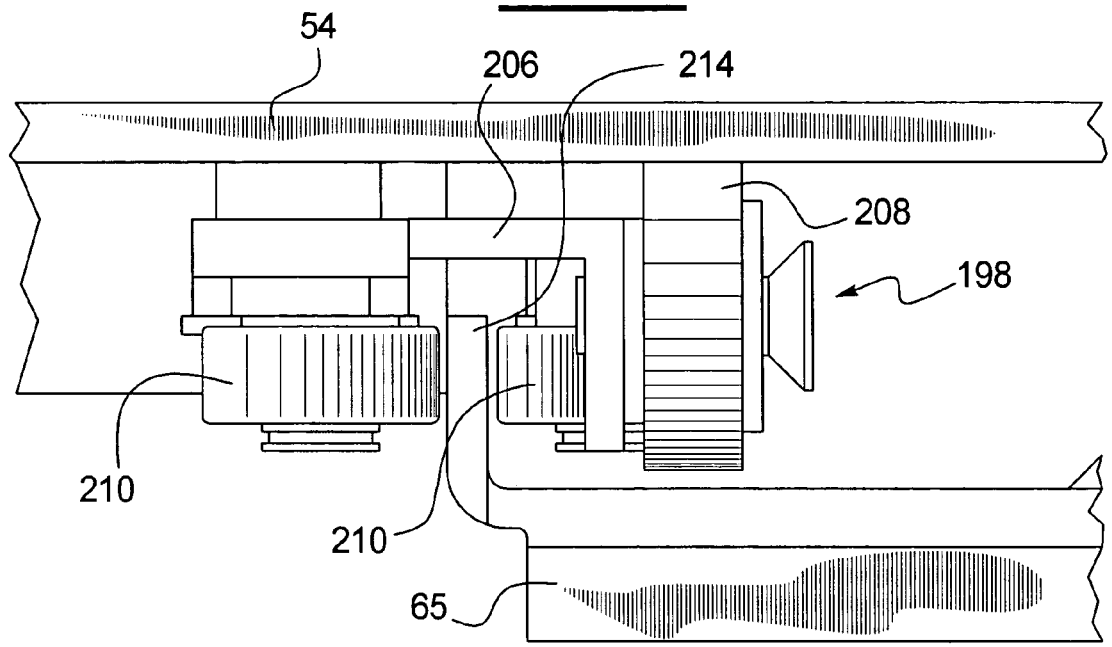
FIG. 16 is an enlarged end view of the traverse guide, right side.

FIG. 16 provides an enlarged view of the traverse roller assembly 198 with the Z-axis roller 208 and the Y-axis rollers 210 on the bracket 206. The bracket 206 is mounted on the traverse base 54 to permit the traverse base to roll over the surface of the traverse guide 65 using the Z-axis roller 208 and to ensure alignment along the Y-axis using the Y-axis rollers 210 to engage the rail 214. The drawing of FIG. 16 shows the Z-axis roller 208 spaced from the surface of the traverse guide 65; however, this would not always be the case during movement of the traverse base 54 along the traverse guide 65.

Figure 17:
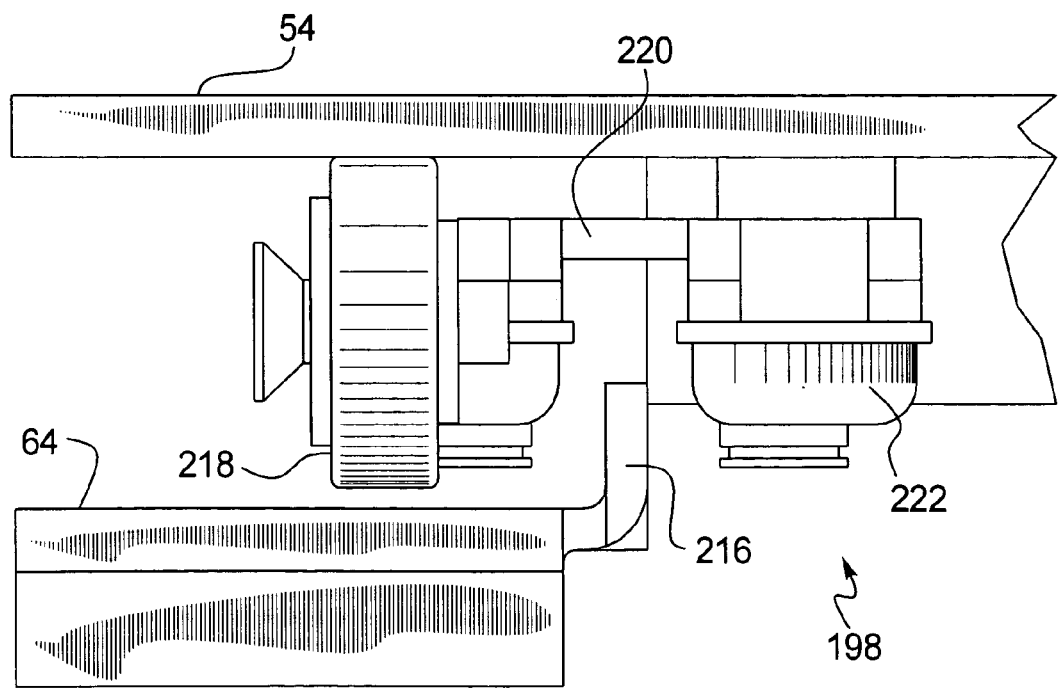
FIG. 17 is an enlarged end view of the traverse guide, left side.

FIG. 16 has shown the right side of the traverse guide. FIG. 17 shows an enlarged view of the traverse guide for the left side of the auto loader. In particular, a left traverse guide 64 has a rail 216 at its edge but no rollers engage this rail so as to prevent binding of the traverse assembly. Instead, the roller assembly 198 includes a Z-axis roller 218 mounted on a bracket 220 that is bolted to the traverse base 54 by bolts or rivets 222. The Z-axis roller 218 engages the surface of the left traverse guide 64.

Referring now to FIG. 18, the traverse top plate assembly 58 includes an elongated plate with the elevator gear assembly 124 and elevator motor 122 mounted at one end thereof. A tilt adjustment mechanism is provided which is assessable through the traverse top plate assembly 58 via adjustment holes 224 which permit the elevator mechanism to be adjusted in the direction of travel along the Y-axis by tilting of an elevator adjustment plate. Accurate alignment of the elevator mechanism is thereby possible through adjustment during assembly and potentially during serving of the present auto loader.

In FIG. 19, the rotator assembly 52 is holding a data cartridge 40. The rotator assembly has a rotator base 106 to which is connected the rotator cover plate 108 and the rotator top guide plate 110. Together these elements form a compartment into which the data cartridge 40 is received during transport of the data cartridge by the cartridge shuttle. The data cartridge 40 is held in the rotator assembly during rotation of the rotator assembly. The entire rotator assembly illustrated in FIG. 19 is rotated about the rotation bearing 178 as shown in FIG. 11.

In data archiving systems which utilize bar codes to identify the data cartridges 40, a bar code reader is provided for reading the cartridges in the rotator assembly 52. An input 226 for the light beam of the bar code reader is provided at the side of the rotator assembly 52 opposite the cartridge receiving opening.

Figure 20:
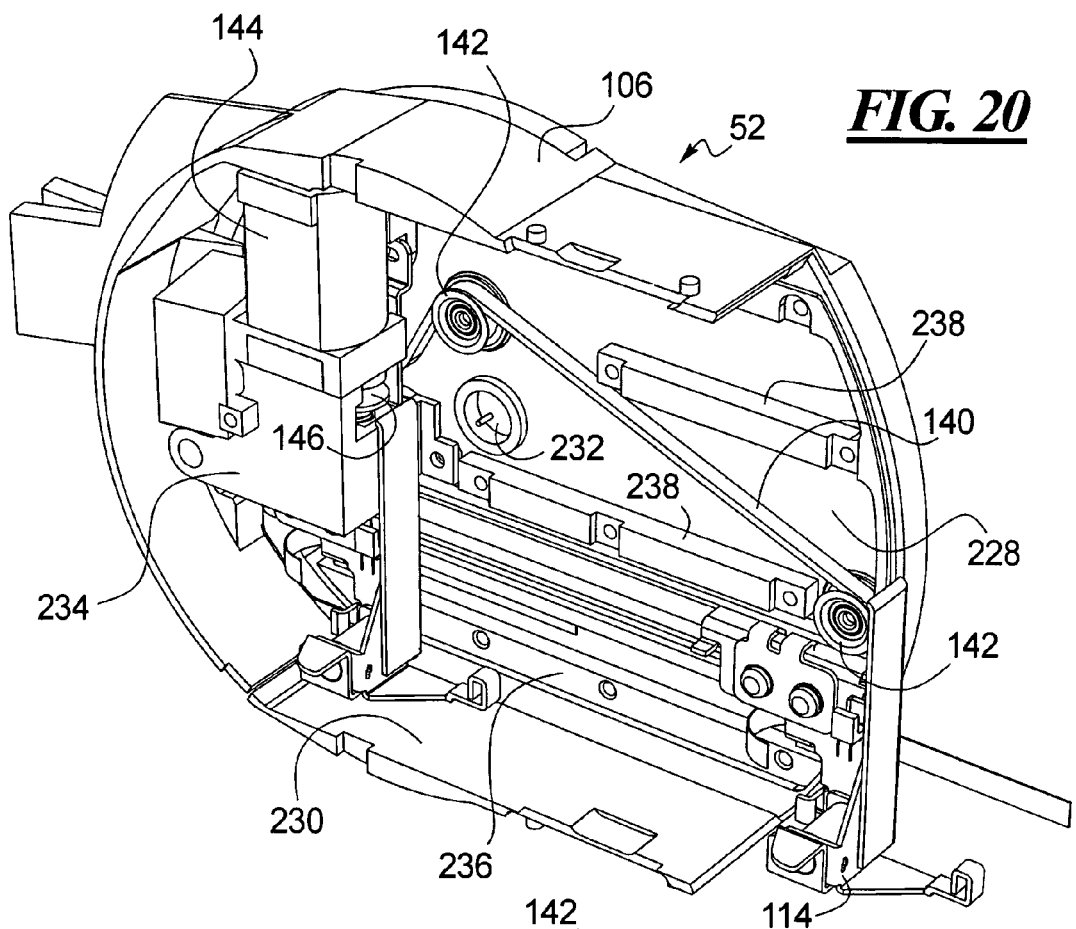
FIG. 20 is a top perspective view of the rotator assembly shown without the rotator cover plate and rotator top guide plate, the cartridge gripper assembly being shown in the outer position.

In FIG. 20, the rotator assembly has had the rotator cover plate 108 and rotator top guide plate 110 removed to reveal the interior workings. In particular, the rotator base 106 includes a bottom wall 228 and a surrounding side wall 230 that has a semi-circular portion and planner portions at each end of the semi-circular portion. A central opening 232 accepts the rotation bearing 178 (FIG. 11) when the apparatus is assembled. The gripper motor 144 drives the gripper gear assembly 146, which is shown within a gripper gear housing 234 to move the cartridge gripper. The cartridge gripper 114 moves along a gripper guide plate 236 mounted to the rotator base 106. Reinforcements 238, are mounted on the bottom plate 228 of the rotator base 106 for added strength to resist the tension in the gripper belt 140. The cartridge gripper 114 is shown in its outer most position, ready to engage a cartridge in a storage magazine slot or in the tape drive so that it can be drawn into the cartridge shuttle.

Figure 21:
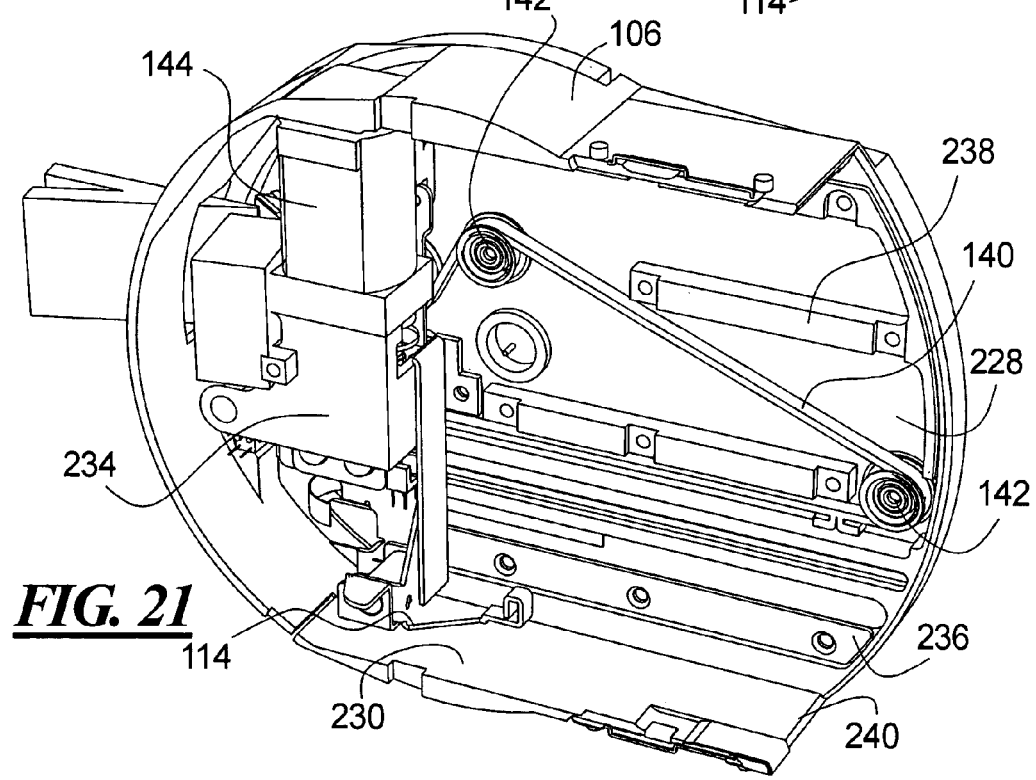
FIG. 21 is a top perspective view of the rotator assembly as shown in FIG. 20 but with the cartridge gripper assembly shown in the inner position.

FIG. 21, the cartridge picker 114 is shown in its inner position, which is the position at which the cartridge picker would lie when it has pulled a tape cartridge completely into the cartridge shuttle for transport. The cartridge picker is preferably also returned to this inner position for storage, such as during power down of the auto loader.

In one embodiment of the present auto loader, a corner of the wall 230 of the rotator base 106 is reinforced at 240 to resist wear and breaking so that the reinforced corner 240 may be used to push tape cartridges into the tape drive.

Figure 22:
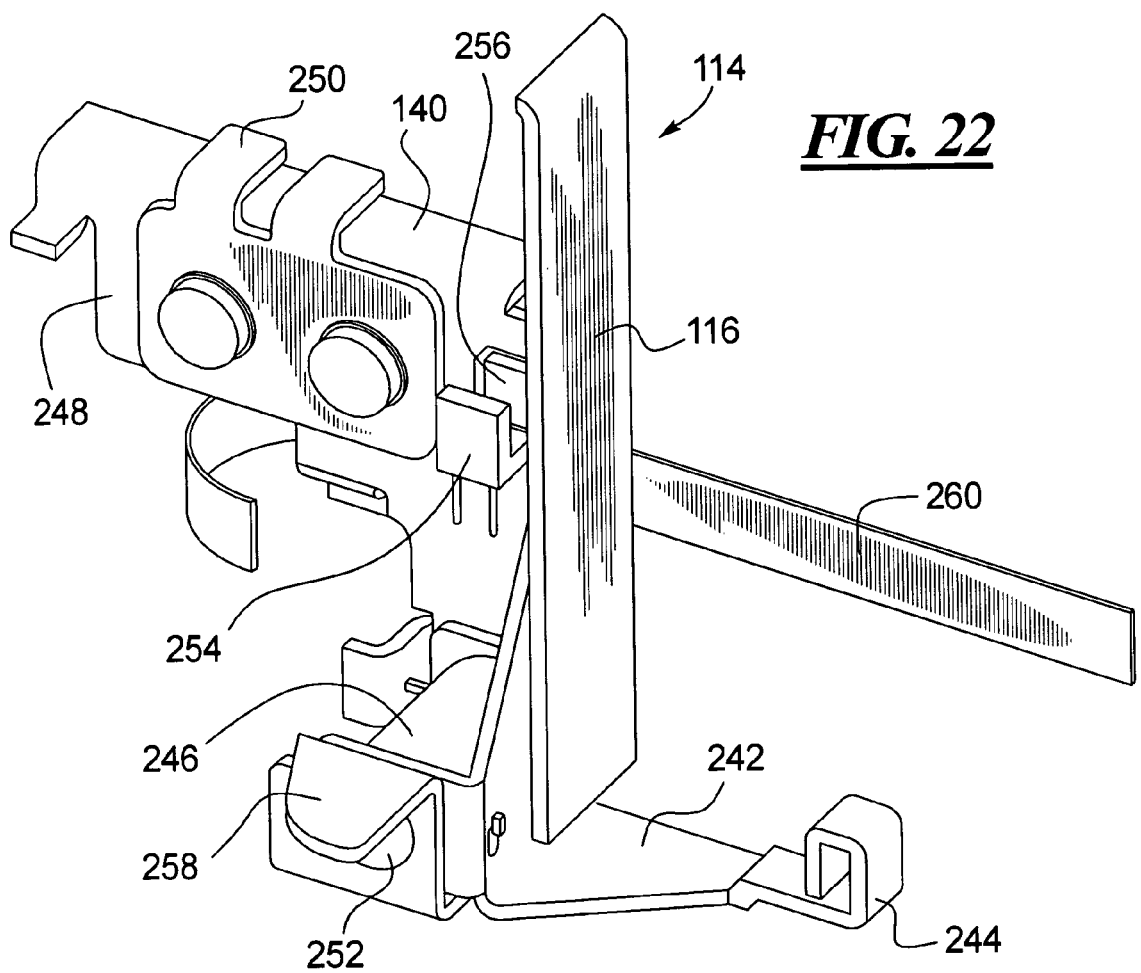
FIG. 22 is an enlarged perspective view of the cartridge gripper assembly.

FIG. 22, shows the cartridge picker 114 in further detail. The cartridge picker 114 has a cartridge stop plate 116 which presses against an end surface of a tape cartridge. Extending from the cartridge stop plate 116 is a picker bracket 242 at the end of which is a cartridge engaging projection 244 which extends into an opening of a side wall of a tape cartridge to permit the tape cartridge to be drawn from a magazine storage slot or the tape drive. The picker bracket 242 is spring loaded for pivoting movement about a torsion spring 246 and thereby pivots during its actions to snap into engagement into the side opening in the tape cartridge. The pivoting movement of the picker bracket 242 is relative to a gripper bracket 248 to which is mounted a belt clamp 250 that engages the gripper belt 140. Pivoting movement of the picker bracket 242 about an access 252 is sensed by a picker detection sensor 254 having an optical beam that is interrupted by a projection 256 extending from the back of the cartridge stop plate 116. Translational movement of the gripper assembly 114 is sensed by interruption of a light beam within the rotator housing by an interrupter extension 258. As a result of the interrupter extension 258 breaking the optical beam of optical sensors at predetermined positions within the rotator housing, the position of the gripper assembly 114 along its movement path can be determined. Electrical signals are carried to the gripper assembly 114 through a cable 260 which is coiled to permit movement of the gripper assembly and which is connected to carry the data signals of the sensor 254, although such connection is not shown in the illustration of FIG. 22 for the sake of clarity.

Figure 23:
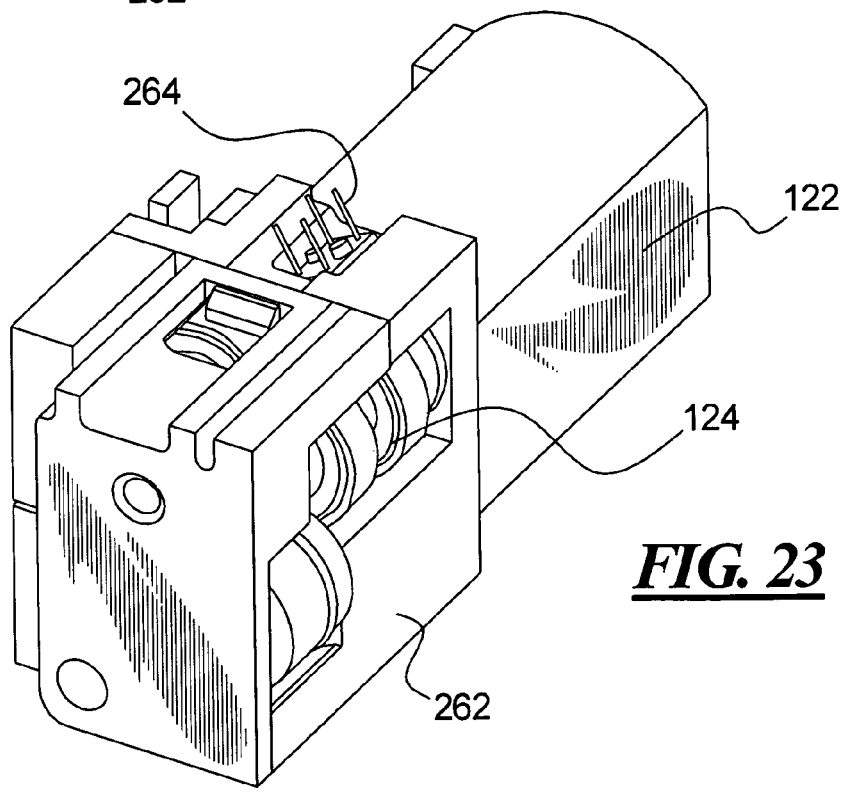
FIG. 23 is an enlarged perspective view of the elevator gear assembly and gear box.

FIG. 23 shows a detailed of the elevated motor and gear assembly 122 and 124, respectively. The elevator gear assembly 124 is housed within a gear box 262 and electrical connections to the sensors which are mounted within the gear box 262 are provided by connection leads 264. The sensors include a photo interrupter and a disk interacting therewith to sense the motion of the elevator.

The electronics of the present shuttle, including the motors and sensors, are under the control of firmware in circuit boards mounted in the housing adjacent the tape drive as well as under control of software operating on the computer system or computer network to which the present device is connected, such as data back up software.

Thus, there is shown and described a cartridge shuttle apparatus for an automated data storage and retrieval device. The shuttle provides movement and positioning in a longitudinal or y direction so that columns of cartridges in a storage magazine can be accessed. Guiding is provided to prevent rotation of the apparatus around the longitudinal axis. Four rollers are provided to create a plane of reference for the chassis bottom plate while allowing for movement in the longitudinal or y direction. The base of the chassis is flexible to adapt to the translational movement of the device.

Guiding along the longitudinal or y axis is based on the four rollers on the side of the shuttle base is rolling on each side of the bent-down edge on a plate for the magazine guide. This creates a fully constrained line which decides the direction of the shuttle in the y axis. The only tolerances involved in the tolerance budget is the position of the rollers and the sheet metal thickness. The shuttle has mounting holes for elevator shafts and elevator assembly, and is driven by a motor, gear pulleys and a belt coupling to the shuttle base. Positioning feedback is provided from a tacho-strip and light interrupter and motor speed control and direction of movement information with quadrature tachometer in the gear box.

The elevator apparatus moves the elevator plate and rotator in the vertical or z direction. The vertical position of the elevator apparatus determines which row of cartridges that shall be accessed. A cable connection is provided to the shuttle. The elevator includes two synchronized lifting screws (belt synchronization) and motor/gear box coupled to one of the two screw shafts. Further, the elevator contains a mounting base for the rotator unit and a motor/gear box for the rotation movement. A rotation stop/height positioning of elevator/rotator relative to the x-axis is controlled by the lifting nuts. The rotation control relative to the z-axis is made by the two screw shafts/nuts and circular hole/oval shaped holes.

The rotator is provided to rotates about the z-axis relative to the elevator by means of the spur gear rim and motor/gear box in the elevator base. The position of the rotator determines if the left or right magazine cartridge slots shall be accessed. The rotator is connection via the elevator by means of a cable. The rotator includes the motor/gear box and the picker which is moved back and forth by means of the belt. The picker gets its feedback from a sensor. A bar code reader is an option so that a quick update of cartridge inventory can be run by means of the translational and elevator movement.

The shuttle has a top cover is that is movable and will rotate relative to its support points during the picker movement. In the case of marginal room in the z-direction above the rotator, an optimal guiding of the cartridge into the rotator (using a moveable guide slot) and that does not occupy much height when the cartridge is fully inserted into the rotator and that permits the robotics to move within the loader is provided.

The rolling loop flex cable used in the present device ensures that during the rotation of the rotator assembly, the flex cable's rolling loop will roll back and forth between the rotator base wall and the elevator base wall. This rolling movement will create a minimum of stress in the cable, and therefore the cable can withstand sufficient number of rotation cycles during the product life time.

Although other modifications and changes may be suggested by those skilled in the art, it is the intention of the inventors to embody within the patent warranted hereon all changes and modifications as reasonably and properly come within the scope of their contribution to the art.

I claim:

1. A cartridge shuttle for use in an automated cartridge recording and playback apparatus, comprising:
    a chassis;
    a rotation frame on said chassis operable to rotate the data cartridge;
        a cartridge picker in said rotation frame operable to draw the data cartridge into the rotation frame and to push the data cartridge from said rotation frame;
    a translation apparatus connected to said chassis for translational movement of said chassis in a translation space so that the data cartridge in the rotation frame is carried from a first location to a second location; and
    an elevator on said chassis, said elevator having said rotation frame mounted thereon, said elevator being operable to move said rotation frame and the data cartridge carried in said rotation frame in a direction substantially perpendicular to the translational movement; said elevator including first and second threaded shafts through threaded nuts at one side of said rotation frame and spring loaded lifters acting at another side of said rotation frame.

2. A cartridge shuttle as claimed in claim 1, wherein said chassis defines a chassis plane; wherein said elevator includes an elevator frame extending substantially perpendicular from said chassis plane, said first and second threaded shafts of said elevator being mounted for rotation in said elevator frame.

3. A cartridge shuttle as claimed in claim 1, wherein said spring loaded lifters include lifter arms connected at a first end to said chassis and second ends bearing against said rotation frame at a side opposite said threaded shafts.

4. A cartridge shuttle as claimed in claim 1, wherein said first and second threaded shafts are connected to one another by a belt.

5. A cartridge shuttle as claimed in claim 4, further comprising:
    an elevator drive connected to move said belt and thereby rotate said threaded shafts substantially in unison, said elevator drive including a sensor connected to detect operation of said elevator drive so as to determine a vertical position of said elevator.

6. A cartridge shuffle as claimed in claim 1, wherein said translation apparatus includes:
first and second guide rails extending along said translation space in parallel and spaced apart from one another;
rollers connected to said chassis and in rolling contact with said first and second guide rails;
a belt extending over pulleys and extending substantially parallel to said first and second guide rails, said chassis being clamped to said belt; and
a belt drive connected to selectively move said belt over said pulleys so as to cause the translational movement of said chassis along said first and second guide rails.

7. A cartridge shuttle as claimed in claim 6, wherein said rollers include a plurality of roller assemblies connected to said. chassis, each of said roller assemblies include a plurality of rollers, said rollers of each roller assembly having axes of rotation along at least two substantially perpendicular directions.

8. A cartridge shuttle as claimed in claim 6, wherein said rollers include a plurality of roller assemblies connected to said chassis, each of said roller assemblies include a plurality of rollers, said rollers of each roller assembly having axes of rotation along at least two substantially parallel directions.

9. A cartridge shuttle as claimed in claim 6, further comprising:
a sensor connected to detect operation of said belt drive so as to determine a position of said chassis along said first and second guide rails.

10. A cartridge shuttle as claimed in claim 6, further comprising:
a rolling loop of flexible cable connected to said chassis and having portions thereof being substantially parallel to the translational movement of said translation apparatus for rolling motion during the translational movement.

11. A cartridge shuttle as claimed in claim 1, wherein said rotation frame includes:
a rotation base portion;
a rotation axis in said rotation base portion;
a cog wheel mounted for rotation in said rotation base portion;
a rotation drive mounted in said rotation base portion and connected to said cog wheel to drive said cog wheel;
said rotation frame mounted for rotation on said rotation axis; and
a spur gear ring mounted on said rotation frame and extending around at least a portion of a circle, said spur gear ring engaging said cog wheel so that operation of said rotation drive causes rotation of said rotation housing on said rotation base.

12. A cartridge shuttle as claimed in claim 11, wherein said rotation drive includes a thumb wheel for manual rotation of said rotation frame on said rotation base portion.

13. A cartridge shuttle as claimed in claim 11, wherein said rotation drive includes a sensor connected to detect operation of said rotation drive so as to determine a rotational position of said rotation frame.

14. A cartridge shuttle as claimed in claim 11, further comprising: a rolling loop of flexible cable connected between said rotation base portion and said rotation frame.

15. A cartridge shuttle as claimed in claim 1, further comprising:

an optical scanner mounted in said rotation frame and directed to read optical data from a cartridge in said rotation frame.

16. A cartridge shuttle as claimed in claim 1, wherein said cartridge picker includes:
gripper rails in said rotation frame;
a belt mounted over pulleys in said rotation frame;
a belt drive connected to move said belt; and
a gripper assembly mounted for movement along said gripper rails, said gripper assembly being connected to said belt for movement along said gripper rails upon operation of said belt drive.

17. A cartridge shuttle as claimed in claim 16, wherein said belt drive includes a sensor connected to detect operation of said belt drive so as to determine a movement of said gripper assembly along said gripper rails.

18. A cartridge shuttle as claimed in claim 1, wherein said cartridge picker includes:
a gripper guide in said rotation frame;
a gripper drive in said rotation frame; and
a gripper assembly mounted for movement along said gripper guide, said gripper assembly being selectively moved by said gripper drive.

19. A cartridge shuttle as claimed in claim 1, wherein said cartridge picker includes a gripper assembly having:
a pusher plate positioned to abut a cartridge during a cartridge pushing motion;
a cartridge gripper with a projection extending from said pusher plate, said projection being selectively engagable into a recess in a data cartridge so as pull the data cartridge along with the cartridge gripper during movement of the gripper assembly into the rotation frame.

20. A cartridge shuttle as claimed in claim 19, wherein said cartridge gripper is spring loaded to flex relative to said rotation frame.

21. A data storage and retrieval device, comprising:
a housing;
a tape drive mounted in said housing;
at least one storage magazine in said housing, said storage magazine having a plurality of storage slots for holding data cartridges;
a cartridge shuttle mounted in said housing and operable to move the data cartridges from said storage magazine to said tape drive and vise versa, said cartridge shuttle including:
a chassis;
a rotation frame on said chassis to rotate the data cartridge;
a cartridge picker in said rotation frame operable to draw the data cartridge into the rotation frame and to push the data cartridge from said rotation frame; and
a translation apparatus connected to said chassis for translational movement of said chassis in a translation space so that the data cartridge in the rotation frame is carried from a first location to a second location; and
an elevator on said chassis, said elevator having said rotation frame mounted thereon, said elevator being operable to move said rotation frame and the data cartridge carried in said rotation frame in a direction substantially perpendicular to the translational movement; said elevator including first and second threaded shafts through threaded nuts at one side of said rotation frame and spring loaded lifters acting at another side of said rotation frame.

* * * * *